(12) United States Patent
Li et al.

(10) Patent No.: US 9,043,343 B2
(45) Date of Patent: May 26, 2015

(54) IDENTIFIER ASSIGNING METHOD, IDENTIFIER PARSING METHOD, AND MULTIMEDIA READING

(75) Inventors: Zhengfang Li, Shenzhen (CN); Yingfeng Lv, Shenzhen (CN)

(73) Assignee: SHENZHEN MPR TECHNOLOGY CO., LTD, Shenzhen (CN)

( * ) Notice: Subject to any disclaimer, the term of this patent is extended or adjusted under 35 U.S.C. 154(b) by 173 days.

(21) Appl. No.: 13/806,463

(22) PCT Filed: Aug. 16, 2010

(86) PCT No.: PCT/CN2010/076023
§ 371 (c)(1),
(2), (4) Date: Jan. 3, 2013

(87) PCT Pub. No.: WO2011/160331
PCT Pub. Date: Dec. 29, 2011

(65) Prior Publication Data
US 2013/0097192 A1   Apr. 18, 2013

(30) Foreign Application Priority Data

Jun. 23, 2010 (CN) .......................... 2010 1 0210707

(51) Int. Cl.
*G06F 17/30* (2006.01)
(52) U.S. Cl.
CPC ...... *G06F 17/30017* (2013.01); *G06F 17/3002* (2013.01)
(58) Field of Classification Search
None
See application file for complete search history.

(56) References Cited

U.S. PATENT DOCUMENTS

| 6,647,447 | B1* | 11/2003 | Kou .............................. 710/100 |
| 2005/0060640 | A1* | 3/2005 | Ross et al. ................. 715/500.1 |
| 2007/0022452 | A1* | 1/2007 | Yamamuro et al. ........... 725/100 |
| 2007/0156726 | A1* | 7/2007 | Levy ............................. 707/100 |
| 2009/0012992 | A1* | 1/2009 | Gill et al. .................. 707/103 R |
| 2010/0306239 | A1* | 12/2010 | Littlejohn et al. ............ 707/769 |

FOREIGN PATENT DOCUMENTS

| CN | 101268684 | 9/2008 |
| CN | 101379464 | 3/2009 |

OTHER PUBLICATIONS

International Search Report for international application No. PCT/CN2010/076023, dated Mar. 31, 2011 (4 pages).

* cited by examiner

*Primary Examiner* — Alex Gofman
*Assistant Examiner* — Umar Mian
(74) *Attorney, Agent, or Firm* — Hamre, Schumann, Mueller & Larson, P.C.

(57) ABSTRACT

An identifier assigning method, an identifier parsing method, and a multimedia reading are provided. The identifier assigning method includes: obtaining association information between at least two objects with different expression forms (101), where the at least two objects with different expression forms have the same subject content; assigning association relationship unique identifiers to the at least two objects with different expression forms according to the association information (102), where the association relationship unique identifier is used to show a unique association relationship among different expression forms with the same subject content, the unique association refers to a unique identifier of an association relationship among various expression forms with different subject content, and the association relationship unique identifiers in each group are globally unique. The method realize a synchronized function demonstration of combined multimedia information, and manage combined multimedia content using the identifier.

23 Claims, 3 Drawing Sheets

FIG. 6

IDENTIFIER ASSIGNING METHOD, IDENTIFIER PARSING METHOD, AND MULTIMEDIA READING

CROSS REFERENCE TO RELATED APPLICATIONS

This application is a national phase application of PCT/CN2010/076023, filed on Aug. 16, 2010. The contents of PCT/CN2010/076023 are all hereby incorporated by reference.

This application claims priority to Chinese Patent Application No. 201010210707.7, filed with the Chinese Patent Office on Jun. 23, 2010 and entitled "IDENTIFIER ASSIGNING METHOD, IDENTIFIER PARSING METHOD, AND MULTIMEDIA READING", which is incorporated herein by reference in its entirety.

BACKGROUND

1. Technical Field

The present application relates to the field of combined digital publishing technologies and cultural management, and in particular, to an identifier assigning method, an identifier parsing method, and a multimedia reading.

2. Related Art

Generally speaking, multimedia information may adopt a variety of content expression forms, such as text, pictures, images, or voice, and meanwhile, such information with the different content expression forms may be further carried in different carrier forms, such as a paper medium, a magnetic medium, optical media, or computer electronic files.

Corresponding identifiers can be found in an existing coding system to manage the foregoing content and carrier forms; even, the same expression form has multiple coding systems. For example, an ISBN, an ISSN, and an ISRC are used to identify the carrier, that is, identify the paper medium, a tape, or an optical disk corresponding to a work; some identifiers, such as, an ISTC and an ISWC, are used to identify content of the work, which has nothing to do with the carrier; and there is still another identifier, such as a DOI, which serves as an identifier of global Internet digital resources, is capable of covering all identifier coding systems, and is mainly used to parse an Internet digital resource.

The existing coding systems may centralizedly manage the multimedia information through different methods, such as manage issuing and copyright. For example, for DOI coding, DOI is short for Digital Object Identifier (digital object identifier), is directed to the whole Internet digital resources, and is used to globally identify objects capable of being identified.

However, with the increasing development of multimedia information dissemination, more novel multimedia information forms, such as an audio multimedia reading, increasingly emerge, but the existing identifier coding systems fail to correctly describe these expression forms of the multimedia information after combination and association and fail to centralizedly manage the forms of the combined multimedia information.

SUMMARY

A technical problem to be solved by the present application is to provide an identifier assigning method, an identifier parsing method, and a multimedia reading. A novel identifier assigning method can be provided, so as to centralizedly manage a form of combined digital multimedia information, such as a multimedia print reader (MPR).

To solve the foregoing technical problem, an embodiment of the present application provides an identifier assigning method, comprising:

obtaining association information of at least two objects with different expression forms, where the at least two objects with different expression forms have the same subject content; and assigning association relationship unique identifiers to the at least two objects with different expression forms according to the association information, where the association relationship unique identifier is used to show a unique association relationship among different expression forms with the same subject content, the unique association refers to a unique identifier of an association relationship among various expression forms different from other subject content, and the association relationship unique identifiers in each group are globally unique.

The association relationship unique identifier may include pre-code and post-code, where the front code is used to uniquely identify a combination of an associated code group.

Further, the association relationship unique identifier may be selected from the group consisting of ten bits of pre-code and six bits of post-code, and ten bits of pre-code and six bits of post-code with one bit of association property kind code added in the pre-code.

The at least two objects with different expression forms may be selected from the group consisting of: objects with different content expression forms, objects with different carrier forms, and objects with different carrier forms and different content expression forms.

Further, association properties and kinds of the pre-code of the unique identifier may include:

a first kind: association properties when the at least two objects with different expression forms include objects with different content expression forms or objects with different carrier forms and different content expression forms; and a second kind: association properties when the at least two objects with different expression forms merely include objects with different carrier forms; and extensible other kinds.

In another aspect, the present application further provides an identifier parsing method, comprising:

obtaining association relationship unique identifiers of at least two objects with different expression forms, where the association relationship unique identifier is used to show a unique association relationship among different expression forms with the same subject content, the unique association refers to a unique identifier of an association relationship among various expression forms different from other subject content, and the association relationship unique identifiers in each group are globally unique; and obtaining association information of the at least two objects with different expression forms according to the association relationship unique identifiers, where the at least two objects with different expression forms have the same subject content.

Further, the method may further comprise:

based on the association information, uniquely identifying and/or parsing, according to one object of the at least two objects with different expression forms, other objects in the at least two objects with different expression forms.

Alternatively, the obtaining association information of the at least two objects with different expression forms according to the association relationship unique identifiers comprises:

establishing a parsing netlist on the basis of a unique identifier set, where the parsing netlist shows position relationship information between the unique association identifiers and the associated objects with different expression forms; and locating and demonstrating associated media content objects on the basis of the parsing netlist.

The association relationship unique identifier may include pre-code and post-code, the pre-code are used to uniquely identify a combination of an association code group, and the combination may correspond to a parsing netlist file. Further, the association relationship unique identifier may be selected from the group consisting of ten bits of pre-code and six bits of rear bits, and ten bits of pre-code and six bits of rear bits with one bit of association property kind code added in the pre-code.

The at least two objects with different expression forms may be selected from the group consisting of: 1) objects with different content expression forms, 2) objects with different carrier forms, and 3) objects with different carrier forms and different content expression forms.

In still another aspect, an embodiment of the present application further provides a multimedia reading, where in the multimedia reading, content with one expression form is uniquely associated with multimedia information with another expression form through association relationship unique identifiers; the unique association refers to a unique identifier of an association relationship among various expression forms different from other subject content, and the association relationship unique identifiers in each group are globally unique.

The content with one expression form and the multimedia information with another expression form have the same subject content.

The association relationship unique identifier is used to show a unique association relationship among different expression forms with the same subject content.

Pre-code of the association relationship unique identifier is used to uniquely identify a multimedia reading, where the reading includes a set of association unique identifiers.

The multimedia reading may include works with combined digital publishing properties, and the unique identifier is printed in a two-dimensional symbol form on a paper carrier associated with the work.

In addition, the multimedia reading may include works with combined digital publishing properties, and the unique identifier may also be stored in an electronic book file carrier in a computer descriptive statement form.

Through the implementation of the embodiments of the present application, the following beneficial effects can be achieved:

In the embodiments of the present application, a novel identifier assigning, and identifier parsing method are provided, in which, identifier codes for showing a unique association relationship among different expression forms with the same subject content are assigned, thereby implementing association among multimedia information with different expression forms, and centralizedly managing a multimedia information form, such as an MPR. For example, when the methods are applied in an application such as the MPR, association between picture and text on the pages of the printed matter and an audio/video digital media file may be implemented and picture and text can be demonstrated.

That is, in the embodiments of the present application, by using different expression forms with the same subject content in a multimedia reading corresponding to a unique identifier, functions presented together by multiple expression forms are fast located and demonstrated among the whole information database. Meanwhile, as the unique identifier is globally unique, a publication and copyright management system related to the multimedia reading may be established on the basis of the identifier.

BRIEF DESCRIPTION OF THE DRAWINGS

To illustrate the technical solutions according to the embodiments of the present application or in the prior art more clearly, accompanying drawings required for describing the embodiments or the prior art are introduced briefly below. Apparently, the accompanying drawings in the following description are merely some embodiments of the present application, and persons of ordinary skill in the art may further obtain other drawings according to the accompanying drawings without creative efforts.

DETAILED DESCRIPTION

The technical solutions in the embodiments of the present application are clearly and completely described in the following with reference to the accompanying drawings in the embodiments of the present application. Obviously, the embodiments to be described are part of rather than all of the embodiments of the present application. All other embodiments obtained by persons skilled in the art based on the embodiments of the present application without creative efforts shall fall within the protection scope of the present application.

Content expression forms and carrier forms of multimedia information become more and more rich, but no identifier system can be used to identify an association relationship among these expression forms, which goes against association and location among multimedia objects with different expression forms. The present application is directed to assigning an identifier to a special association relationship, so as to realize a synchronized function demonstration of combined digital multimedia information and perform processing such as managing the combined digital multimedia content by using the association relationship.

Figure 1:
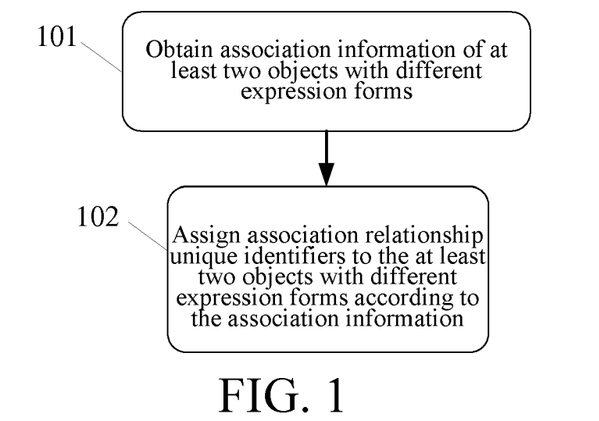
FIG. 1 is a specific schematic flowchart of an identifier assigning method in an embodiment of the present application.

As shown in FIG. 1, an embodiment of the present application provides an identifier assigning method, comprising:

101: Obtain association information of at least two objects with different expression forms, where the at least two objects with different expression forms have the same subject content.

The "objects with different expression forms" may include the following content.

1) The objects may include objects with different content expression forms, such as multimedia information with content expression forms such as text, pictures, images, and voice. For example, the object may be a text with the same certain subject content in an electronic book; by clicking the text of an electronic book displayed on a screen of an electronic book reading tool, the electronic book reading tool parses a unique association code corresponding to the text content, and then locates and plays, through the association code, an audio associated with the text content. In this example, carriers are the same (which are all computer electronic files stored in/identified by the electronic book tool), but the content expression forms are different;

2) The objects may include objects with different carrier forms, such as multimedia information with different carrier forms (a paper medium, a tape, an optical disk, or a hard disk). Furthermore, different reading tools (for example, a specific hardware equipment or a computer software) may also be considered as the different expression forms corresponding to the carriers in the description of the present application; for example, when the publications are issued with a digital publishing form, in a certain electronic issuing platform and a reading platform thereof, association between electronic book content in a reader carrier and in a network database carrier is achieved. To implement on-line reading or downloading (off-line reading) of publications in an electronic book version by using the electronic book reading machine, when a reader opens a specific electronic book, the reader can locate and download the electronic book content or perform real-time on-line reading by parsing a unique association code (the unique code is assigned to the electronic book content associated between the specific electronic book reading device carrier and the electronic book network database server carrier serving the reading device) related to different carrier forms and assigned to the electronic book; and 3) The objects may include objects with different carriers and different content expression forms. For example, the objects with different expression forms include: paper-medium picture and text content and audio/video digital media files, both of which have different content expression forms (one has picture and text content, the other one has audio/video content) and different carriers (one has a paper carrier, and in the other one, the computer electronic files are stored in a hardware equipment). For example, an MPR has the corresponding picture and text part associated with the audio/video digital content in publications such as paper books and newspapers, and when the reader reads a certain association code on the page of the publications through an MPR reading device, the audio/video files corresponding to the association code can be demonstrated.

In the first and the third conditions in the embodiment of the present application, when the reading is published in an MPR form, the unique identifier may be attached to pages of the paper books and newspapers in a symbol printing manner; or when the reading is issued in an electronic book form, through a specific file format, the unique identifier may be embedded into the picture and text content, and the associated media content may be located and demonstrated through a parsing netlist established on the basis of the unique identifier.

The foregoing "association information" refers to information indicating association relationship between two objects with different expression forms. In specific applications, the information indicating association relationship has different content and meanings For example, for publications such as teaching materials, the association information may be association between paper or electronic picture and text teaching materials and corresponding lesson planning content, and more specifically, may be association between the word "horse" or a horse picture and the corresponding sound (a dynamic video of the horse) of the horse; or the association information may be association between a physical experiment diagram or text and a video process; or for a tourist map, the association information may be association between the map and an audio/video explanation of the map.

The foregoing case that "the objects have the same subject content" refers to that these objects have the same subject content; for example, for an audio multimedia reading, the case that the paper-medium picture and text content (that is, one object with a specific expression form) and the electronic audio file content (that is, another object with a specific expression form) have the same subject content may be construed as that the audio content demonstrates corresponding phonetic pronunciation of the text content or the audio content further illustrates and describes the picture and text content.

102: Assign association relationship unique identifiers to the at least two objects with different expression forms according to the association information, where the association relationship unique identifier is used to show a unique association relationship among different expression forms with the same subject content, and the unique association refers to a unique identifier of an association relationship among various expression forms different from other subject content, and the association relationship unique identifiers in each group are globally unique.

In a specific embodiment of the present application, the association relationship unique identifier includes pre-code and post-code, and the pre-code are used to uniquely identify a combination of an association code group. It should be noted that, in a multimedia reading application, a multimedia reading represents a combination of all association codes of such a reading, and then the pre-code uniquely identify such a multimedia reading.

Figure 2:
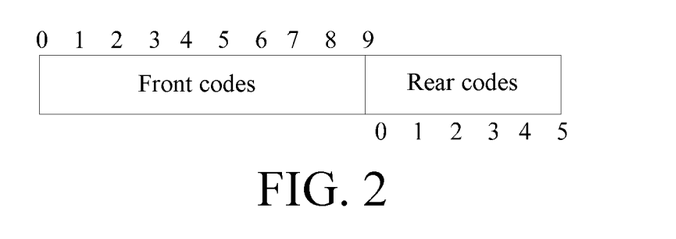
FIG. 2 is a schematic view of a specific composition of a unique identifier in an embodiment of the present application.
Figure 3:
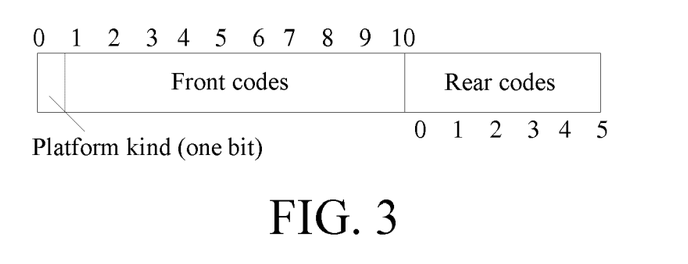
FIG. 3 is a schematic view of another specific composition of a unique identifier in an embodiment of the present application.

Moreover, the pre-code are ten bits of pre-code, and the post-code are six bits of post-code; meanwhile, alternatively, one bit of association property kind code is added in the pre-code of the unique identifier. The addition of one bit of association property kind code actually refers to that the unique identifier is extended to 17 bits. Such a manner conforms to characteristics of an MPR code symbol, where an available capacity of the MPR code symbol is seven bytes rather than ten bits of decimal number; the 7-byte maximum number FFFFFFFFFFFFFFH is converted into a decimal number 72057594037927935D, where the highest bit is les than 10; 0-6 number at the highest bit may be used now to serve as a platform code. As shown in FIG. 2 and FIG. 3, a composition form of the unique identifier is shown, where the relation positions of the pre-code and the post-code as well as the relative position of the association property kind code in the pre-code may be presented in other manners, and the details are not described herein.

The foregoing association property kinds may include the following kinds:

a first kind: association properties when the at least two objects with different expression forms include objects with different content expression forms, or objects with different carrier forms and different content expression forms, which can be applied to a multimedia reading;

a second kind: association properties when the at least two objects with different expression forms merely include objects with different carrier forms, that is, an inter-carrier association application of an object with single content, including an electronic book, on-line music, or on-line video simply with text and pictures and formally published; and extensible other kinds.

In a specific embodiment of the present application, in the multimedia reading described above, the pre-code may be set to be an integration of an association combination in the paper-medium picture and text content (that is, content in paper publications), and for the post-code, it may be determined through the combination requirements whether to segment and how to segment (for example, the post-code may be set to be page serial numbers or code serial numbers). In this way, the association relationship unique identifier is obtained by assigning identifiers to basically associated units of the multimedia reading, thereby implementing association between picture and text positions and digital media files in the publications and further demonstrating the picture and text in a digital media form.

When the objects with different expression forms are Internet digital resource objects, the acquisition of the association relationship unique identifier is equivalent to assigning permanent identifiers to the Internet digital resources, and even if a Uniform/Universal Resource Locator (URL) of the Internet digital resources is changed, a unique identifier can also be provided for the uniquely identified resource objects.

In the prior art, if it is required to locate a resource via the Internet, the URL needs to be used; however, when the position of the resource is moved, a link for the resource cannot be ensured all the time by using the URL address. However, in the embodiment of the present application, association relationship unique identifiers (the content rather than the URL is associated) are established between the resources, and then, no matter how the position of the resource is moved at present, the unique identifier keeps unchanged and is unique. Such a mapping form may be implemented through a parsing database. That is to say, the association relationship unique identifier may be used as a permanent identifier code of such Internet digital media resources with cross-media association requirements or association requirements among different content expression forms.

Meanwhile, a specific carrying form of the association relationship unique identifier may be determined according to different application standards, for example, carriers such as a barcode symbol or a Radio Frequency Identification (RFID) may be used.

It can be known from the foregoing description that, the association relationship unique identifier is used so as to provide a permanent identifier with a fixed character format and length for on-line access to the digital resources. Because the identifier is a unique identifier, a specific content unit can be fast located among massive data.

Figure 4:
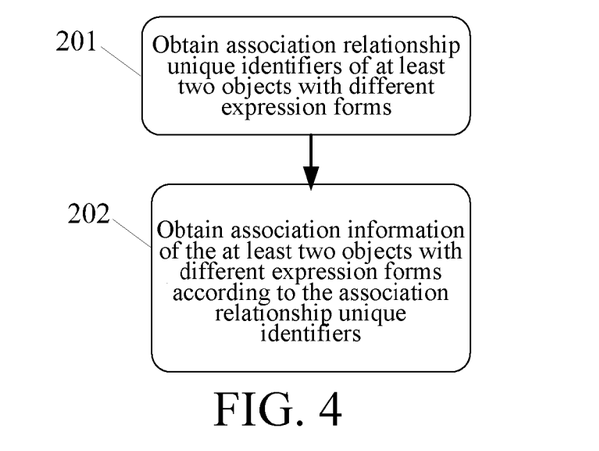
FIG. 4 is a specific schematic flowchart of an identifier parsing method in an embodiment of the present application.

Corresponding to the foregoing identifier assigning method, an embodiment of the present application further provides a method for parsing the unique identifier, which is shown in FIG. 4 and includes the following steps.

201: Obtain association relationship unique identifiers of at least two objects with different expression forms, where the association relationship unique identifier is used to show a unique association relationship among different expression forms with the same subject content, the unique association refers to a unique identifier of an association relationship among various expression forms different from other subject content, and the association relationship unique identifiers in each group are globally unique.

202: Obtain association information of the at least two objects with different expression forms according to the association relationship unique identifiers, where the at least two objects with different expression forms have the same subject content.

The explanations of the terms and motions in the steps are consistent with those in the foregoing embodiment, so the details are not described herein again.

Figure 5:
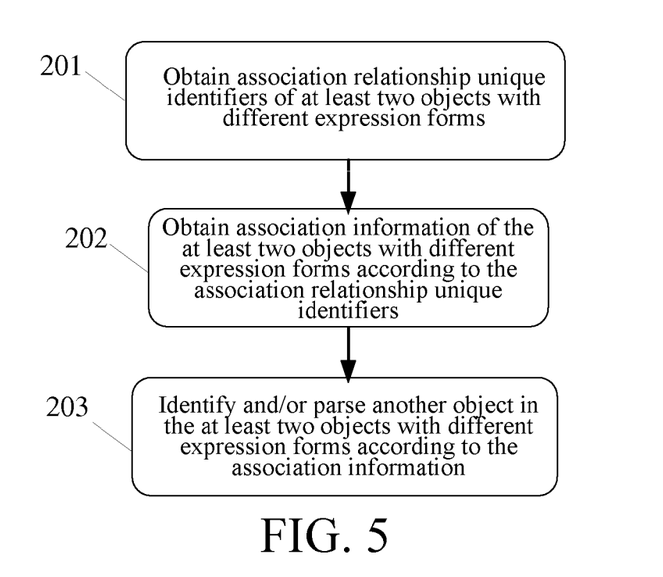
FIG. 5 is another specific schematic flowchart of an identifier parsing method in an embodiment of the present application.

Further, as shown in FIG. 5, the method further includes the following step.

203: Based on the association information, uniquely identify and/or parse, according to one object of the at least two objects with different expression forms, other objects in the at least two objects with different expression form.

Figure 6:
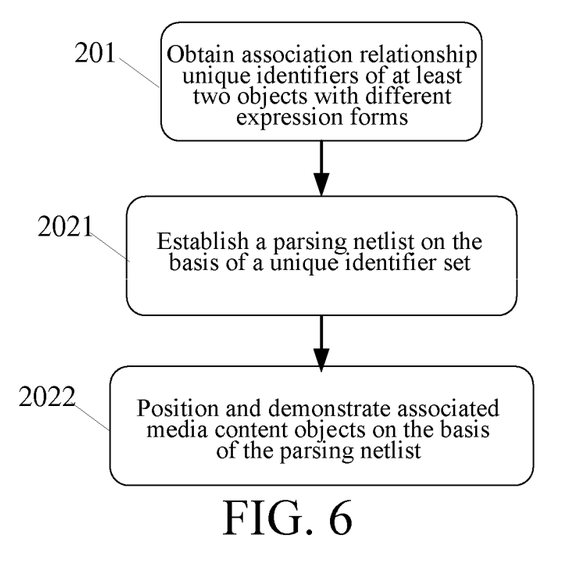
FIG. 6 is still another specific schematic flowchart of an identifier parsing method in an embodiment of the present application.

Alternatively, the step 202 may specifically include the following sub-steps, as shown in FIG. 6.

2021: Establish a parsing netlist on the basis of a unique identifier set, where the parsing netlist shows position relationship information between the unique association identifiers and the associated objects with different expression forms.

2022: Locate and demonstrate associated media content objects on the basis of the parsing netlist.

For example, if a reading device performs local reading, in a digital media file of the foregoing "parsing netlist" that locally uses each front code as a basic file and has a file format including an association relationship between a unique identifier of all post-code following the pre-code and a storage position of the associated digital media content unit, where the digital media file is named by using a duotricemary notation of the pre-code. The reading device opens the corresponding digital media file by obtaining the pre-code of the identifier, and then obtains the storage address of the associated media content from the parsing netlist of the digital media file by obtaining the post-code of the identifier, thereby demonstrating the media content unit.

In the case of on-line access to the Internet, secondary parsing of associated content address in the target database is involved. The parsing netlist is stored in a network database for centralizedly managing the association identifiers, uses a front code as a basic file unit, performs file retrieval in the parsing netlist by using a front code value, and stores a mapping relationship between a unique code and a network address of the associated media content, based on which, the associated media content is located and demonstrated.

Meanwhile, the at least two objects with different expression forms are selected from the group consisting of:

1) objects with different content expression forms, for example, multimedia information with content expression forms such as text, pictures, images, and voice;

2) objects with different carrier forms, such as multimedia information with expression forms being different carriers (a paper medium, a tape, an optical disk, or a hard disk); and 3) objects with different carrier forms and different content expression forms.

For the association relationship in the case of the expression form of the second kind, it is not required to synchronously demonstrate the different content expression forms; the post-code are used to identify a whole work such as en electronic book merely having text content. At this time, a code of the first bit of the unique identifier may be used as the association property code in the pre-code, codes of the second to the fourth bits are used as management mechanism codes (codes assigned to a mechanism for operating a certain digital content publishing platform) in the pre-code, and codes of the subsequent 13 bits are used as post-code. If an ISBN number is assigned to such an electronic book, the ISBN number may be used as post-code of the unique identifier of the electronic book. Likewise, the existing identifier systems, such as a serial identifier ISSN or a musical composition identifier ISMN, for a single object can all be classified into such an association property kind Because the work with combined digital publishing properties are given a unique identifier, this identifier code may be disseminated in multiple forms, such as printing a flyer or journal and newspaper advertisements with the unique code symbol. The association relationship in the case of the second expression form is more applicable to such application. In an electronic book merely including text content, the unique code of the electronic book may be printed on the flyer in a two-dimensional symbol form, which is merely used for fast retrieval and location of digital content; after a user pays, a full access right can be gained.

In another aspect, for the foregoing three conditions of the objects with different expression forms, the association property kinds of the pre-code of the unique identifier may include:

a first kind: association relationship properties in the case of the first and the third expression forms, that is, the identifier is applied in a multimedia reading;

a second kind: association relationship properties in the case of the second expression form, that is, an inter-carrier association application of an object with single content, including an electronic book, on-line music, or on-line video simply with text and pictures and formally published; and extensible other kinds, including applications of a distributed database managed by platform providers for providing network-based content such as paid commodity information, tourism information, anti-fake information, encyclopedic knowledge, and advertisement services.

In other specific embodiments of the present application, when the unique identifier is attached to the associated expression form (for example, printing a barcode symbol on a book page), an association relationship unique identifier code may be first automatically identified and obtained by using an electronic device, and then associated information corresponding to the association relationship unique identifier code is parsed by using a parsing netlist, corresponding associated content is obtained according to the association information, and the corresponding associated content is displayed on the electronic device. The content of the digital media file is locally stored in the electronic device. As long as the pre-code are used as the index to open the MPR digital media file corresponding to the pre-code, and then a storage address of the digital media content associated with the unique identifier code, obtained by the parsing netlist of the post-code and stored in the digital media file is retrieved, the digital media content associated with the code can be directly demonstrated. The obtaining and demonstration of the content may also be implemented in real time and on line in the network database, that is, the electronic device accesses the whole network database center, uses the pre-code as the index to open the parsing netlist file of the multimedia reading, obtains a network address of the digital media content associated with the unique identifier code through the netlist file, and acquires content by accessing the address, so as to implement on-line demonstration.

In a specific embodiment of the present application, a party having the association relationship may be demonstrated by using the unique identifier. Either with a paper printing form or with an electronic book form, the associated books and newspapers share the unique identifier with the digital media content. In other words, the unique identifier showing such an association relationship may independently exist. For example, in an MPR book introducing scenic spots, the unique identifier may be stored in an RFID label at a corresponding geographical position, and a demonstration device plays digital media content (audio/video introducing scenic spots) corresponding to the association by reading the unique identifier in the RFID; or the unique identifier is stored in a secondary parsing file of the demonstration file, where the secondary parsing file includes GPS locating points and a corresponding relationship among unique identifiers of the MPR book introducing scenic spots, and the demonstration device may directly demonstrate an audio/video content of a spot at a position of a tourist.

In a specific embodiment of the present application, multiple applications may be implemented by using the foregoing identifier assigning and identifier parsing methods. For example, an embodiment of the present application further provides a multimedia reading, where the multimedia reading is uniquely associated with multimedia information with another expression form through association relationship unique identifiers, the multimedia reading and the multimedia information have the same subject content, and the association relationship unique identifier is used to show a unique association relationship among different expression forms with the same subject content.

For example, the multimedia reading includes works with combined digital publishing properties, and the unique identifier is printed in a two-dimensional symbol form on a paper carrier associated with the work. As described above, the associated paper carrier may be a flyer of an electronic book.

In the foregoing multimedia reading, the identifier assigning and identifier parsing methods are used to obtain the association relationship unique identifier, and the unique identifier may be used to manage the multimedia reading.

Through the following description of the embodiment, functions of the association relationship unique identifier can be further understood.

The association relationship unique identifier is applied in MPR publishing platform technologies.

In the MPR publishing platform technologies, a digital publishing platform with a self-publishing function and a commercial profit mode is provided for a publishing unit. The copyright value of the MPR publications is reflected in pricing and issuing of paper books by the publishing unit. In the MPR publishing platform technologies, an MPR code is used as a specific code form of the association relationship unique identifier.

If a publishing body of a party in the MPR code association relationship does not use a paper medium, for example, in an electronic book application, to ensure health and long-term development of the industry, a digital publishing and issuing platform capable of being actively controlled by the content provider also needs to be constructed for a content providing industry, where the content provider has a right to issue and price a specific work. Such a combined digital publishing platform can be constructed by using an MPR publishing system, and the providing of the combined digital content of this platform is positioned on the basis of parsing technologies centralizedly managed and having a unique identifier instead of open resource search engine technologies. A manager of the published content may use the platform to implement register management on the combined digital publisher, and standardized management of producing and issuing the combined digital published content.

The association relationship unique identifier may have many other functions. For example, because the works with the combined digital publishing properties are given a unique identifier, this code may be disseminated in multiple forms such as printing a flyer or journal and newspaper advertisements with the unique identifier, and the codes are merely used for fast retrieval and location of digital content; after a user pays, a full access right can be gained.

If publishing management with a copyright protection platform is implemented on the network published content, a problem that there are no effective management measures in the field of network and phone publishing may be solved. Formal combined digital publications are issued through this platform, the publisher can gain digital issuing reward, the user can enjoy the services of the whole digital published information content (by using a reading tool supporting the copyright protection standard of the platform). The reading device manufacturers manufacture reading devices according to the standards without concerning the published content resources (the reading device supports a user card authentication interface for video on-demand services, and the users are managed by a content resource department in charge), and the manager can used the platform to manage the publishing units and make statistics of the digital published information. Technical measures needs to be emphasized to avoid piracy and decryption.

The unique identifier in the embodiment of the present application may be an International Standard Connection Code (ISCC) identifier in actual applications, and an identifier system thereof is referred to as an ISCC system.

It can be known from the foregoing description that, the embodiments of the present application provide a method for identifying and parsing an association relationship among novel multimedia objects, and an application of such a method. In the method, a unique association relationship among different expression forms with the same subject content is coded. When the method is applied to an application such as a multimedia reading, association between positions and digital media files in the publications can be implemented, and on-line demonstration of these positions can be further implemented. In the embodiment of the present application, by using different expression forms with the same subject content in a multimedia reading corresponding to a unique identifier, functions presented together by multiple expression forms are fast located and demonstrated among the whole information database. Meanwhile, as the unique identifier is globally unique, the unique identifier may be applied in publication and copyright management of such a multimedia reading.

Those of ordinary skill in the art should understand that all or a part of the steps of the method according to the embodiments of the present application may be implemented by a program instructing relevant hardware. The program may be stored in a computer readable storage medium. When the program is run, the steps of the method according to the embodiments of the present application are performed. The storage medium may be a magnetic disk, an optical disk, a Read-Only Memory (ROM), or a Random Access Memory (RAM), The above descriptions are merely preferred embodiments of the present application, but are not intended to limit the present application. Any equivalent modification made according to the claims of the present application still fall within the scope of the present application.

What is claimed is:

1. An identifier assigning method, comprising:
    obtaining association information of at least two objects with different expression forms, wherein the at least two objects with the different expression forms have a same subject content; and
    assigning an association relationship unique identifier to the at least two objects with the different expression forms according to the association information, wherein the association relationship unique identifier is used to show a unique association relationship among the different expression forms with the same subject content, the association relationship unique identifier identifies the unique association relationship among the different expression forms with the same subject content that is different from other subject content, and the association relationship unique identifier is globally unique,
    wherein a digital media content is located and demonstrated through a parsing netlist established on a basis of the association relationship unique identifier, the association relationship unique identifier comprising a pre-code and a post-code,
    wherein when a reading device performs local reading, the parsing netlist is located in a local digital media file that uses the pre-code as a basic file and has a file format including an association relationship between the association relationship unique identifier of the post-code following the pre-code and a storage address of the respective digital media content,
    wherein the reading device opens the local digital media file by obtaining the pre-code of the association relationship unique identifier, and then obtains the storage address of the respective digital media content from the parsing netlist of the local digital media file by obtaining the post-code of the association relationship unique identifier, thereby demonstrating the respective digital media content,
    wherein in case of on-line access to the Internet, the parsing netlist is stored in a network database for centralizedly managing the association relationship unique identifier, using the pre-code as a basic file unit, performing file retrieval in the parsing netlist by using the pre-code, storing a mapping relationship between the association relationship unique identifier and a network address of the digital media content, and based on the mapping relationship, locating and demonstrating the digital media content, and
    wherein the association relationship unique identifier is associated with the at least two objects with the different expression forms.

2. The method according to claim 1, wherein the association relationship unique identifier comprises a pre-code and a post-code; and the pre-code are used to uniquely identify a combination of an association code group.

3. The method according to claim 2, wherein the association relationship unique identifier is selected from the group consisting of ten bits of pre-code and six bits of post-code, and ten bits of pre-code and six bits of post-code with one bit of association property kind code added in the pre-code.

4. The method according to claim 1, wherein the at least two objects with the different expression forms are selected from the group consisting of:
    objects with different content expression forms, objects with different carrier forms, and objects with different carrier forms and different content expression forms.

5. The method according to claim 2, wherein the at least two objects with the different expression forms are selected from the group consisting of: objects with different content expression forms, objects with different carrier forms, and objects with different carrier forms and different content expression forms.

6. The method according to claim 2, wherein association property kinds of the pre-code of the association relationship unique identifier comprise:
    a first kind of association properties when the at least two objects with the different expression forms comprise objects with different content expression forms or objects with different carrier forms and different content expression forms; and
    a second kind of association properties when the at least two objects with the different expression forms merely comprise objects with different carrier forms.

7. An identifier parsing method, comprising:
- obtaining an association relationship unique identifier of at least two objects with different expression forms, wherein the association relationship unique identifier is used to show a unique association relationship among the different expression forms with a same subject content, the association relationship unique identifier identifies the unique association relationship among the different expression forms of the same subject content that is different from other subject content, and the association relationship unique identifier is globally unique; and
- obtaining association information of the at least two objects with the different expression forms according to the association relationship unique identifier, wherein the obtaining association information of the at least two objects with the different expression forms according to the association relationship unique identifier comprises:
- establishing a parsing netlist on a basis of a unique identifier set, the unique identifier set includes a plurality of association relationship unique identifiers, each of the association relationship unique identifiers comprising a pre-code and a post-code, wherein the parsing netlist shows a position relationship information between the respective at least two objects with the different expression forms of the respective same subject content and the respective association relationship unique identifier; and
- locating and demonstrating the respective two objects based on the respective association relationship unique identifier on the parsing netlist,
- wherein when a reading device performs local reading, the parsing netlist is located in a local digital media file that uses a same pre-code as a basic file and has a file format including an association relationship between the respective association relationship unique identifiers of the respective post-codes following the same pre-code and storage addresses of respective digital media contents,
- wherein the reading device opens the corresponding local digital media file by obtaining the same pre-code, and then obtains the respective storage addresses of the respective digital media contents from the parsing netlist of the local digital media file by obtaining the respective post-codes, thereby demonstrating the respective digital media contents;
- wherein in case of on-line access to the Internet, the parsing netlist is stored in a network database for centralizedly managing the association relationship unique identifiers, using the same pre-code as a basic file unit, performing file retrieval in the parsing netlist by using the same pre-code, storing a mapping relationship between a network address of the respective digital media contents and the respective post-codes, and based on the mapping relationship, locating and demonstrating the respective digital media contents, and
- wherein each of the association relationship unique identifiers is associated with at least two objects with different expression forms.

8. The method according to claim 7, further comprising:
based on the association information, uniquely identifying or parsing, according to one object of the at least two objects with the different expression forms, other objects in the at least two objects with different expression forms.

9. The method according to claim 7, wherein each of the association relationship unique identifiers comprises a pre-code and a post-code, and
wherein each of the pre-codes is used to uniquely identify a combination of an association code group or uniquely identify a parsing netlist.

10. The method according to claim 8, wherein each of the association relationship unique identifiers comprises a pre-code and a post-code, and
wherein each of the pre-codes is used to uniquely identify a combination of an association code group or uniquely identify a parsing netlist.

11. The method according to claim 7, wherein each of the association relationship unique identifiers comprises a pre-code and a post-code, and
wherein each of the pre-codes is used to uniquely identify a combination of an association code group or uniquely identify a parsing netlist.

12. The method according to claim 9, wherein each of the association relationship unique identifiers is selected from the group consisting of ten bits of pre-code and six bits of post-code, and ten bits of pre-code and six bits of post-code with one bit of association property kind code is added in the pre-code.

13. The method according to claim 10, wherein each of the association relationship unique identifiers is selected from the group consisting of ten bits of pre-code and six bits of post-code, and ten bits of pre-code and six bits of post-code with one bit of association property kind code is added in the pre-codes.

14. The method according to claim 11, wherein each of the association relationship unique identifiers is selected from the group consisting of ten bits of pre-code and six bits of post-code, and ten bits of pre-code and six bits of post-code with one bit of association property kind code is added in the pre-codes.

15. The method according to claim 7, wherein the respective at least two objects with the different expression forms are selected from the group consisting of: objects with different content expression forms, objects with different carrier forms, and objects with different carrier forms and different content expression forms.

16. The method according to claim 8, wherein the respective at least two objects with the different expression forms are selected from the group consisting of: objects with different content expression forms, objects with different carrier forms, and objects with different carrier forms and different content expression forms.

17. The method according to claim 7, wherein the respective at least two objects with the different expression forms are selected from the group consisting of: objects with different content expression forms, objects with different carrier forms, and objects with different carrier forms and different content expression forms.

18. The method according to claim 12, wherein association property kinds of the pre-code of the respective association relationship unique identifier comprise:
- a first kind of association properties when the respective at least two objects with the different expression forms comprise objects with different content expression forms or objects with different carrier forms and different content expression forms; and
- a second kind of association properties when the respective at least two objects with the different expression forms merely comprise objects with different carrier forms.

19. The method according to claim 13, wherein association property kinds of the pre-code of the respective association relationship unique identifier comprise:
- a first kind of association properties when the respective at least two objects with the different expression forms comprise objects with different content expression forms or objects with different carrier forms and different content expression forms; and a second kind of association properties when the respective at least two objects with the different expression forms merely comprise objects with different carrier forms.

20. The method according to claim 14, wherein association property kinds of the pre-code of the respective association relationship unique identifier comprise:

a first kind of association properties when the respective at least two objects with the different expression forms comprise objects with different content expression forms or objects with different carrier forms and different content expression forms; and a second kind of association properties when the respective at least two objects with the different expression forms merely comprise objects with different carrier forms.

21. A non-transitory multimedia reading medium, uniquely associated with multimedia information with another expression form through an association relationship unique identifier, wherein the association relationship unique identifier refers to a unique identifier of an association relationship among various expression forms with a same subject content that is different from other subject content, and the association relationship unique identifier being globally unique, wherein the non-transitory multimedia reading medium and the multimedia information have a same subject content, wherein the association relationship unique identifier is used to show a unique association relationship among the different expression forms with the same subject content, wherein a digital media content is located and demonstrated through a parsing netlist established on a basis of the association relationship unique identifier, the association relationship unique identifier comprising a pre-code and a post-code, wherein when a reading device performs local reading, the parsing netlist is located in a local digital media file that uses the pre-code as a basic file and has a file format including an association relationship between the association relationship unique identifier of the post-code following the pre-code and a storage address of the respective digital media content, wherein the reading device opens the local digital media file by obtaining the pre-code of the post-code of the association relationship unique identifier, and then obtains the storage address of the respective digital media content from the parsing netlist of the digital media file by obtaining the post-code of the association relationship unique identifier, thereby demonstrating the respective digital media content, wherein in the case of on-line access to the Internet, the parsing netlist is stored in a network database for centralizedly managing the association relationship unique identifier, using the pre-code as a basic file unit, performing file retrieval in the parsing netlist by using the pre-code, storing a mapping relationship between the association relationship unique identifier and a network address of the respective digital media content, and based on the mapping relationship, locating and demonstrating the respective digital media content, and wherein the association relationship unique identifier is associated with the at least two objects with the different expression forms.

22. The non-transitory multimedia reading medium according to claim 21, further comprising: works with combined digital publishing properties, and the association relationship unique identifier is printed in a two-dimensional code form on a paper carrier associated with the work.

23. The non-transitory multimedia reading medium according to claim 22, further comprising: works with combined digital publishing properties, and the association relationship unique identifier is stored in an electronic file carrier in a descriptive computer format.

* * * * *